(12) United States Patent
Sauer et al.

(10) Patent No.: US 10,863,218 B2
(45) Date of Patent: *Dec. 8, 2020

(54) METHOD FOR SYNCHRONIZING GOPS AND IDR-FRAMES ON MULTIPLE ENCODERS WITHOUT COMMUNICATION

(71) Applicant: Skitter, Inc., Norcross, GA (US)

(72) Inventors: Mark Sauer, Bragg Creek (CA); Robert Saunders, Alpharetta, GA (US)

(73) Assignee: Skitter, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,406

(22) Filed: Jul. 9, 2019

(65) Prior Publication Data
US 2019/0335216 A1    Oct. 31, 2019

Related U.S. Application Data

(63) Continuation of application No. 15/685,110, filed on Aug. 24, 2017, now Pat. No. 10,375,430.

(51) Int. Cl.
*H04N 21/242* (2011.01)
*H04N 21/2343* (2011.01)
(Continued)

(52) U.S. Cl.
CPC ......... *H04N 21/242* (2013.01); *H04L 65/607* (2013.01); *H04L 65/608* (2013.01);
(Continued)

(58) Field of Classification Search
CPC ............. H04N 21/242; H04N 21/2343; H04N 21/23439; H04N 21/23608;
(Continued)

(56) References Cited

U.S. PATENT DOCUMENTS 9,462,270 B1 * 10/2016 Lan ...................... H04N 21/242
10,375,430 B2 * 8/2019 Sauer ................. H04N 21/2343
(Continued)

OTHER PUBLICATIONS

PCT/US2018/047702, "International Search Report and Written Opinion", dated Nov. 30, 2018.

*Primary Examiner* — Hai V Tran
(74) *Attorney, Agent, or Firm* — Meunier Carlin & Curfman LLC

(57) ABSTRACT

A video distribution system synchronizes video output streams on multiple encoders without communication therebetween. Each of the encoders is configured to decode a source video content stream into a sequence of uncompressed frames, where each frame in the sequence is marked with an associated presentation time stamp (PTS) clock value. The encoders calculate a number of clock cycles between instantaneous decoder refresh (IDR)-frames. For each frame in the sequence, the encoders calculate a remainder after a division of an associated PTS clock value of a given frame by the number of clock cycles between IDR-frames. The encoders mark each frame in the sequence as an IDR-frame where the corresponding remainder is strictly less than the number of PTS clock cycles per frame and mark a remainder of the frames in the sequence as an internal frame within a group of pictures (GOP) to produce a marked set of video frames. The encoders pass the marked set video frames through a video codec to produce the synchronized video output streams.

20 Claims, 3 Drawing Sheets

(51) Int. Cl.
*H04N 21/236* (2011.01)
*H04N 21/43* (2011.01)
*H04N 21/4402* (2011.01)
*H04N 21/6437* (2011.01)
*H04N 21/854* (2011.01)
*H04L 29/06* (2006.01)

(52) U.S. Cl.
CPC ... *H04N 21/2343* (2013.01); *H04N 21/23439* (2013.01); *H04N 21/23608* (2013.01); *H04N 21/4305* (2013.01); *H04N 21/4402* (2013.01); *H04N 21/6437* (2013.01); *H04N 21/854* (2013.01)

(58) Field of Classification Search
CPC .......... H04N 21/4305; H04N 21/4402; H04N 21/6437; H04N 21/854; H04L 65/607; H04L 65/608
See application file for complete search history.

(56) References Cited

U.S. PATENT DOCUMENTS

| | | | |
|---|---|---|---|
| 2006/0120463 A1* | 6/2006 | Wang | H04N 19/70 375/240.25 |
| 2007/0005333 A1* | 1/2007 | Setiohardjo | H04N 5/77 703/24 |
| 2007/0206673 A1* | 9/2007 | Cipolli | H04L 1/1607 375/240.1 |
| 2009/0147842 A1* | 6/2009 | Jacobs | H04N 21/23424 375/240.01 |
| 2009/0220011 A1* | 9/2009 | Kursawe | H04N 21/23424 375/240.25 |
| 2009/0323809 A1* | 12/2009 | Raveendran | H04N 19/46 375/240.16 |
| 2010/0054329 A1* | 3/2010 | Bronstein | H04N 19/147 375/240.03 |
| 2011/0317760 A1* | 12/2011 | Chen | G11B 27/007 375/240.12 |
| 2012/0284371 A1* | 11/2012 | Begen | H04L 65/1069 709/219 |
| 2013/0007223 A1* | 1/2013 | Luby | H04N 21/23106 709/219 |
| 2013/0044803 A1* | 2/2013 | Fisher | H04N 21/2343 375/240.02 |
| 2014/0140417 A1* | 5/2014 | Shaffer | H04N 21/23608 375/240.28 |
| 2014/0185466 A1* | 7/2014 | Syed | H04L 43/50 370/252 |
| 2017/0302959 A1* | 10/2017 | Samchuk | H04N 21/2343 |
| 2019/0036763 A1* | 1/2019 | Sauer | H04L 67/2842 |

* cited by examiner

METHOD FOR SYNCHRONIZING GOPS AND IDR-FRAMES ON MULTIPLE ENCODERS WITHOUT COMMUNICATION

CROSS-REFERENCE TO RELATED APPLICATIONS

This application is a continuation of U.S. Ser. No. 15/685,110, filed Aug. 24, 2017, titled "Method for Synchronizing GOPS and IDR-Frames on Multiple Encoders Without Communication," which is hereby incorporated by reference in its entirety.

BACKGROUND

In a cable-TV headend, typically there are a number of devices, including satellite-, terrestrial- and/or fiber-receivers, which provide raw streams for the channels and stations required by the cable-TV channel line-up. In some cases, these raw signals are sent directly to the customer premise set-top-box equipment for display to the end user. However, typically these direct signals are very wasteful of network resources. They also do not provide for adaptive bit rate, where the same stream is encoded at different bitrates and resolutions to provide flawless streaming in spite of variations in the network performance in transferring the streams to the end-user's customer premise equipment (CPE).

To address this, and to ensure that all the signals follow the same standard of encoding, the raw signals are typically passed through a set of encoders or transcoders, which are configured to output the streams with the required video and audio codecs, at the required set of bitrates and resolutions. The resulting outputs are then multiplexed into the desired streaming format, which may include but is not limited to video in the MPEG4 ASP, MPEG4 AVC, MPEG4 HEVC formats and audio in the MPEG1, MPEG2, MPEG4 AAC formats, though any other video and audio codecs may be used. For example, if a cable TV system is using a digital transmission method to their customers, and the customers have customer premise equipment (CPEs) that support playback of MPEG4 AVC video, MPEG4 AAC audio in a MPEG2 Transport Stream, then the encoders or transcoders would input the various formats provided by the various receivers, and output a standard MPEG2 Transport Stream containing the required codecs.

Segmenting video into small chunks and then sending the small chunks over the internet has become a popular way to deliver video. Examples of segmented video streaming standards include the HTTP Live Streaming standard (HLS), MPEG-DASH, and Smooth Streaming. A segmentation server receives a video stream as input, and then creates segments or chunks. The segmentation server creates the segments, and stores them on a disk, in computer RAM or in some other method of storage as needed. As the segments are created, a playlist file is maintained that lists the available chunks, and addresses where the chunks can be accessed by a requestor. One advantage that segmented video delivery has over linear video delivery (e.g. delivery via unicast, multicast or http chunked transfer encoding) is that the playlists, and video chunks can be delivered using ubiquitous http servers and caching technology.

SUMMARY

Aspects of the disclosure provide a content distribution system comprising an encoder at a headend. The encoder comprises a processor and computer instructions stored in a non-transitory computer readable storage medium. The processor is configured to execute the instructions to cause the encoder to decode a source video content stream into a sequence of uncompressed frames, where each frame in the sequence is marked with an associated presentation time stamp (PTS) clock value. The processor is configured to execute the instructions to cause the encoder to also calculate a number of clock cycles between instantaneous decoder refresh (IDR)-frames. For each frame in the sequence, the processor is configured to execute the instructions to cause the encoder to also calculate a remainder after a division of an associated PTS clock value of a given frame by the number of clock cycles between IDR-frames. The processor is configured to execute the instructions to cause the encoder to also mark each frame in the sequence as an IDR-frame where the corresponding remainder is strictly less than a number of PTS clock cycles per frame and mark a remainder of the frames in the sequence as an internal frame within a group of pictures (GOP) to produce a marked set of video frames. The processor is configured to execute the instructions to cause the encoder to also pass the marked set video frames through a video codec to output an output video content stream.

In some aspects of the disclosure, the processor is configured to execute the instructions to cause the encoder to discard frames in the sequence prior to a first IDR-frame.

In some aspects of the disclosure, the content distribution system also comprises a second encoder with a second processor and second computer instructions stored in a non-transitory computer readable storage medium. The second processor is configured to execute the second instructions to cause the second encoder to decode the source video content stream into a second sequence of uncompressed frames, where each frame in the second sequence is marked with an associated PTS clock value. The second processor is configured to execute the second instructions to cause the second encoder to calculate the number of clock cycles between IDR-frames. For each frame in the second sequence, the second processor is configured to execute the second instructions to cause the second encoder to calculate a remainder after a division of an associated PTS clock value of a given frame by the number of clock cycles between IDR-frames. The second processor is configured to execute the second instructions to cause the second encoder to mark each frame in the second sequence as an IDR-frame where the corresponding remainder is strictly less than the number of PTS clock cycles per frame and mark a remainder of the frames in the second sequence as an internal frame within a GOP to produce a second marked set of video frames. The second processor is configured to execute the second instructions to cause the second encoder to pass the second marked set video frames through a second video codec to output a second output video content stream.

In some aspects of the disclosure, the second output video content stream is identical to the output video content stream.

In some aspects of the disclosure, the encoder and the second encoder are not in communication with one another.

In some aspects of the disclosure, the second encoder is at the headend.

In some aspects of the disclosure, the second encoder is at a location remote from the headend.

In some aspects of the disclosure, the content distribution system further comprises a segmentation server configured to receive the output video content streams and generate segments and a playlist for the output video content stream.

In some aspects of the disclosure, the content distribution system further comprises a video distribution network between the headend and one or more customer premise equipment, the video distribution network configured to receive the output video content stream and provide the output video content stream to the customer premise equipment.

In some aspects of the disclosure, the content distribution system further comprises a receiver at the headend configured to receive the source video content stream.

In some aspects of the disclosure, the source video content stream is an MPEG-2 transport stream, a real time streaming protocol (RTSP) stream, a real time messaging protocol (RTMP) stream, an HTTP Live Streaming (HLS) stream, or a moving picture experts group—dynamic adaptive streaming over HTTP (MPEG-DASH) stream.

In another aspect of the disclosure, a method of synchronizing video output streams on multiple encoders without communication therebetween is provided. The method comprises decoding, at each of the encoders, a source video content stream into a sequence of uncompressed frames, where each frame in the sequence is marked with an associated presentation time stamp (PTS) clock value. The method comprises calculating, at each of the encoders, a number of clock cycles between instantaneous decoder refresh (IDR)-frames. For each frame in the sequence, the method comprises calculating, at each of the encoders, a remainder after a division of an associated PTS clock value of a given frame by the number of clock cycles between IDR-frames. The method comprises marking, at each of the encoders, each frame in the sequence as an IDR-frame where the corresponding remainder is strictly less than the number of PTS clock cycles per frame and marking a remainder of the frames in the sequence as an internal frame within a group of pictures (GOP) to produce a marked set of video frames. The method comprises passing the marked set video frames through a video codec to produce the synchronized video output streams.

In some aspects of the disclosure, the method further comprises discarding, by each of the encoders, frames in the sequence prior to a first IDR-frame.

In some aspects of the disclosure, the synchronized video output streams from each of the encoders is identical.

In some aspects of the disclosure, the encoders are located at the same headend.

In some aspects of the disclosure, the encoders are located at different headends.

In some aspects of the disclosure, the method further comprises generating, by a segmentations server in communication with one of the encoders, segments and a playlist for the video output stream by the one of the encoders.

In some aspects of the disclosure, the method further comprises distributing, via a video distribution network between the encoders and a plurality of customer premise equipment, the synchronized video output streams from the encoders to the plurality of customer premise equipment.

In some aspects of the disclosure, the method further comprises receiving, by receivers in communication with the encoders, the source video content stream.

In some aspects of the disclosure, the source video content stream is an MPEG-2 transport stream, a real time streaming protocol (RTSP) stream, a real time messaging protocol (RTMP) stream, an HTTP Live Streaming (HLS) stream, or a moving picture experts group—dynamic adaptive streaming over HTTP (MPEG-DASH) stream.

These and other features will be more clearly understood from the following detailed description taken in conjunction with the accompanying drawings and claims. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
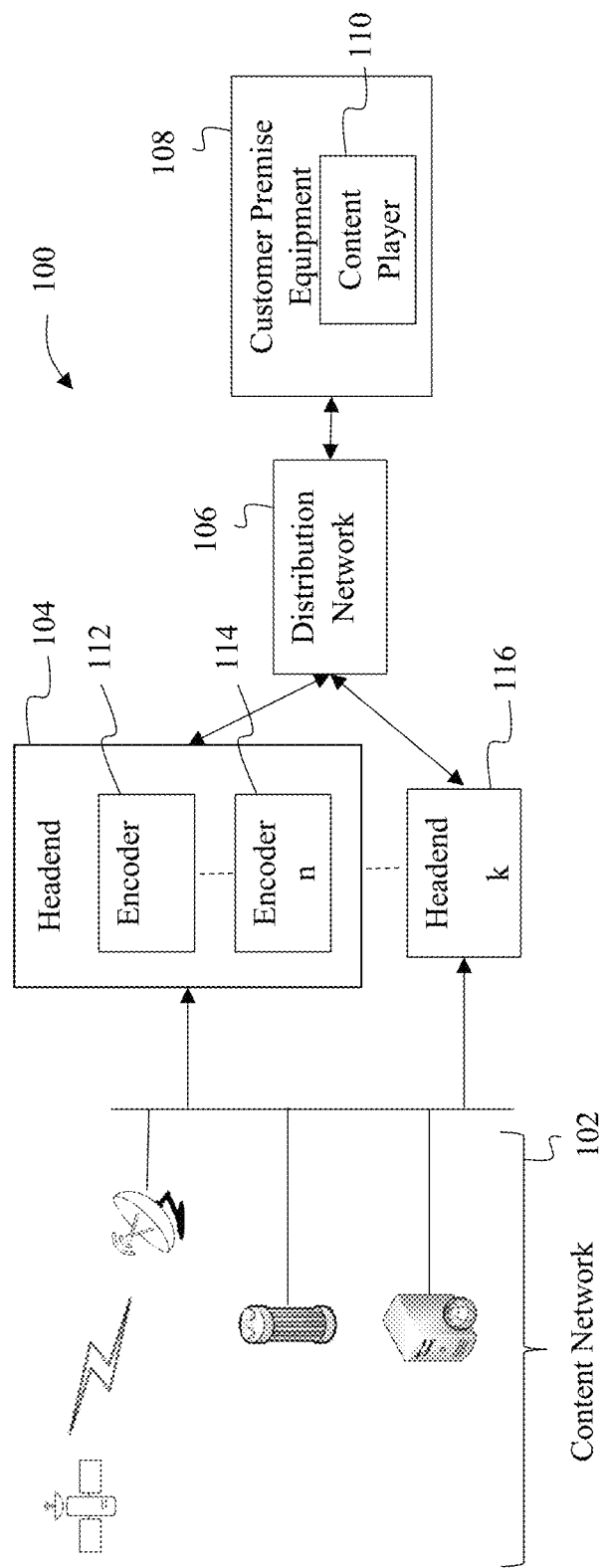
FIG. 1 shows an exemplary content distribution system suitable for implementing various embodiments of the disclosure.

It should be understood at the outset that although illustrative implementations of one or more embodiments are provided below, the disclosed systems and methods may be implemented using any number of techniques, whether currently known or in existence. The disclosure should in no way be limited to the illustrative implementations, drawings, and techniques provided below, but may be modified within the scope of the appended claims along with their full scope of equivalents.

When designing a cable-TV headend, it is desirable to have multiple encoders or transcoders for each stream, possibly at the same headend location, or possibly distributed geographically at different locations. Having multiple encoders for each stream allows for failover protection in the event of a failure of an encoder. If the encoders are also at different geographic locations, then the streams output by the different encoders could primarily be used to supply video to customers which are closer to the encoder.

In order for the multiple encoders to provide for failover protections, the encoders need to output streams that have the same Group Of Pictures (GOP) structure including the production of Instantaneous Decoder Refresh (IDR)-frames. A GOP is a basic unit of video encoding that includes a set of frames in the stream of pictures which comprise the video. When encoding a GOP, the first frame is an IDR-frame and the rest are I-, P-, or B-frames. Any frame marked as an IDR-frame in a video stream is guaranteed to decode correctly and reset the state of the decoder such that subsequent frames will decode without issues (e.g. macro-blocking or other corruption). An I-frame stands for an Intra-Coded frame—a frame that uses techniques to code the frame that do not require any predictions from previous or future video frames. Because of this, an IDR-frame is usually an I-frame. A P-frame stands for a Predicted frame—a frame uses techniques to code the frame that may include predictions from previously coded frames in the stream (to take advantage of the fact that often a large portion of a frame does not change too much from one picture to the next, or that objects in the frame may have moved a small amount). A B-frame stands for a Bidirectionally Predicted frame—a frame uses techniques to code the frame that may include predictions from previous and future frames in the stream.

Typically, each encoder is free to choose its own GOP-structure, and there is no guarantee that the GOP structure chosen is identical from one encoder to the next for the same stream. Each encoder would mark the first frame processed as an IDR-frame, and then cause a new IDR-frame to be produced every n-frames where n is a parameter to the encoder. In some encoders, additional IDR-frames may be inserted when a scene change is detected, (e.g. where a very large percentage of the contents of the frame is detected to differ from the previous frame).

A method to ensure that the GOP structure and associated IDR-frames used by the set of encoders processing the same stream is identical includes to mark the location of the IDR-frames within the stream. The selection of the frame types for the remaining frames in a GOP is determined by the encoding layer. Assuming each encoder is configured the same way, using the same encoding layer, and has the same input, it follows that the resulting internal GOP structure will be identical.

To avoid the need for communication between the set of encoders processing the same stream, the Presentation Time Stamp (PTS) timestamp associated with the video-frames as they are input to the encoder is used. PTS is a precise clock which defines at which time each frame should be presented to the viewer. In some implementations, the PTS is measured in units of a 90 khz clock. Accordingly, for a given video input, each of a plurality of different encoders generate IDR-frames at the same locations using the PTS clock of the video input and likewise generate a GOP structure that is identical.

FIG. 1 shows an exemplary content distribution system 100 suitable for implementing various embodiments of the disclosure. The content distribution system 100 includes a content network 102, a headend 104, and a distribution network 106. The content network 102 may include one or more satellite-, terrestrial- and/or fiber-receivers, which provide raw streams for the content to be distributed by the content distribution system 100, such as the channels or stations used in a cable-TV channel line-up. Each of the receivers in the content network 102 receive a source content stream and supply the source content stream to the headend 104. The source content stream may be an MPEG2 Transport Stream, RTSP, RTMP, HLS, MPEG-DASH, or any other possible video or content streaming technology. Each of the receivers in the content network may communicate with the headend 104 via a direct communication path or over a shared communication path. While depicted as separate from the headend 104, the receivers of the content network 102 may be part of the headend 104.

The headend 104 includes one or more encoders, such as encoder 112. While referenced as an encoder, the encoder 112 may be an encoder and/or transcoder. The encoder 112 receives one or more of the content streams supplied by the receivers in the content network 102 and is configured to output one or more content streams with the required video and/or audio codecs, at a required set of bitrates and resolutions for the content distribution system 100. The output of the encoder 112 may include one or more video streams, each with a GOP structure and a set of IDR-frames. The one or more video streams may be segmented video streams. The headend 104 may also include one or more decoders, demultiplexers, multiplexers (not shown) or other equipment to produce the one or more content streams suitable for distribution via the content distribution system 100.

As shown in FIG. 1, the headend 104 may include a plurality of encoders, including the encoder 112 and an $n^{th}$ encoder 114. Each of the encoders 112, 114 may be configured to receive the one or more of the content streams supplied by the receivers in the content network 102. The encoders 112, 114 are also configured to output one or more content streams with the required video and/or audio codecs, at a required set of bitrates and resolutions, and with identical GOP structures and IDR-frames. For example, the encoder 112 is configured to input a first video stream and output a second video stream with a first GOP structure and a first set of IDR-frames. The second video stream is output by the encoder 112 in accordance with a different video codec, audio codec, bitrate, and/or resolution than the first video stream. The encoder 114 is likewise configured to input the first video stream and output the second video stream with the first GOP structure and the first set of IDR-frames. In other words, with the same input content stream, the encoders 112, 114 output the same output content stream with the same GOP structure and set of IDR-frames.

In some instances, the content distribution system 100 includes a plurality of headends, including the headend 104 and a $k^{th}$ headend 116. The headend 116 may be at a different geographic location than the headend 104. Each of the headends 104, 116 include one or more encoders, such as the encoders 112, 114 described above. The headend 116 receives content streams from the receivers in the content network 102. In some implementations, the headend 116 receives content streams from receivers in a different content network or at a different geographic location than the content network 102. As above, the one or more encoders of the headend 116 are configured such that with the same input content stream as the encoder 112, the one or more encoders of the headend 116 output the same output content stream with the same GOP structure and set of IDR-frames.

The output of each of the encoders in the headends 104, 116 is provided to a distribution network 106 for supplying the content streams to customer premise equipment (CPE), such as CPE 108. While the distribution network 106 is shown as a single element, separate distribution networks may be present between the headends 104, 116 and CPEs that the headends 104, 116 supply. Likewise, the distribution network 106 may include a plurality of remote content distribution centers for supplying the content streams to distinct groups of CPE. While the distribution network 106 is shown as a separate element than the headends 104, 116, one or more components of the distribution network 106 may be present at the headends 104, 116. For example, one or more origin segmentation servers that form part of the distribution network 106 may be present at the headends 104, 116. Additionally, the distribution network 106 may include one or more edge segmentation servers and/or one or more caching servers.

In some implementations, the distribution network 106 may be configured as disclosed in the commonly owned patent application entitled, "Method for Creation and Distribution of Segmented Video over Distributed Multicast-Aware Sparse Networks with Low Latency," filed on Aug. 24, 2017, application Ser. No. 15/685,106, hereby incorporated by reference in its entirety for all purposes. Other distribution network architectures may be used. When segmentation servers form part of the distribution network 106, the segmentation servers may be configured and operate as disclosed in commonly owned patent application Ser. No. 15/662,870, filed on Jul. 28, 2017 and entitled, "System and Method for Providing Fault Tolerant Streaming of Segmented Content and Cache Coherency on Multi-Hosted Origin Systems," hereby incorporated by reference in its entirety for all purposes.

The CPE 108 includes a content player 110 for playing and/or recording the content streams provided by the distribution network 106. While only a single CPE 108 is shown in FIG. 1, in practice a plurality of CPE receive the content streams provided by the distribution network 106.

Figure 2:
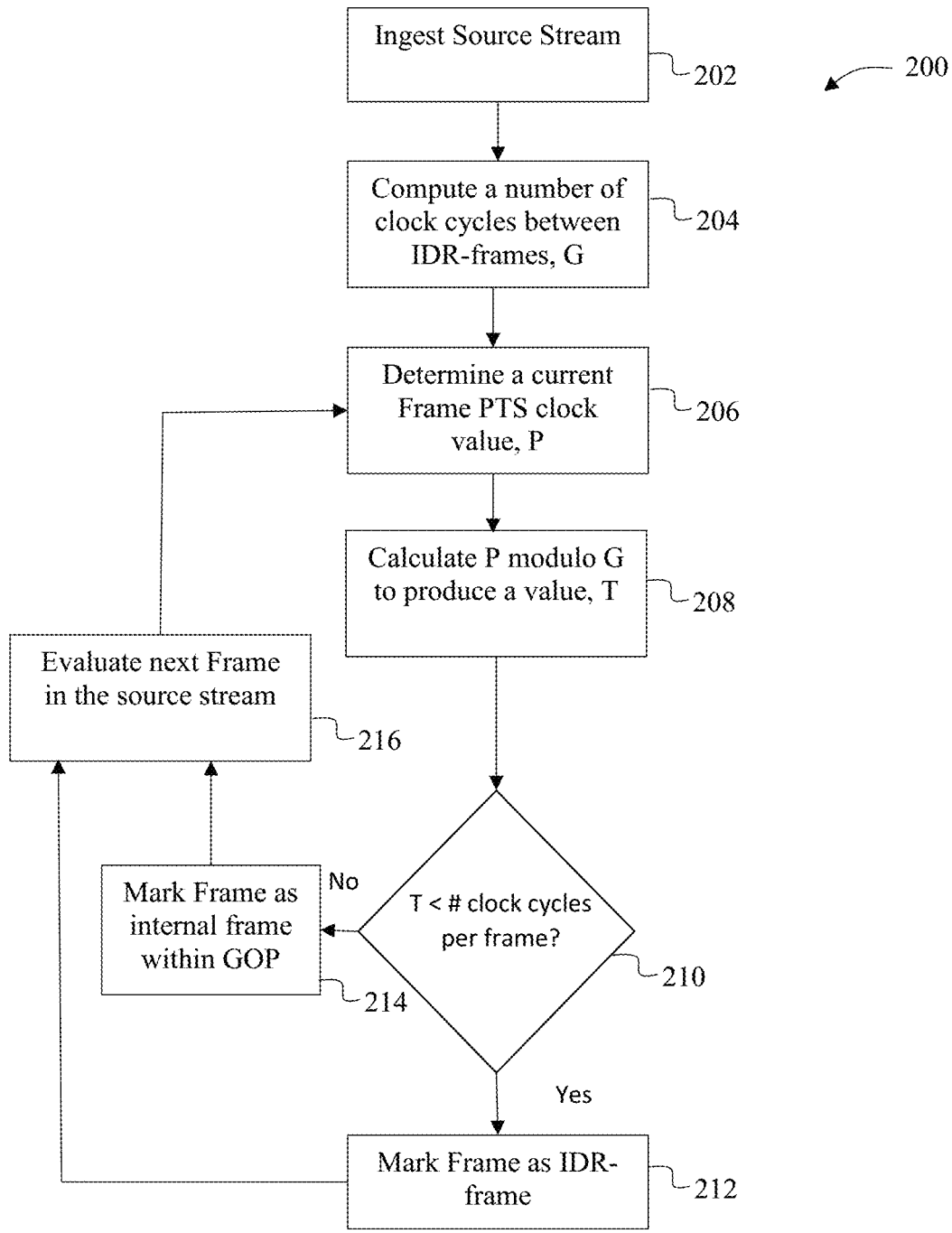
FIG. 2 shows an exemplary process for the encoders in the content distribution system to produce output content stream(s) with identical sets of IDR-frames and identical GOP structures suitable for implementing various embodiments of the disclosure.

FIG. 2 shows an exemplary process 200 for the encoders 112, 114 in the content distribution system 100 to produce an identical GOP structure and set of IDR-frames suitable for implementing various embodiments of the disclosure. Specifically, the process 200 ensures, for a given input source content stream, all of the encoders in the distribution system 100 mark the IDR-frames at the same point in time based on the PTS clock values of the source content stream. Accordingly, the encoders will all generate an identical output content stream with the same set of IDR-frames and the same GOP structure. For illustration purposes only, the process 200 is described below with particular reference to the encoder 112. However, the process 200 may be likewise implemented on all of the encoders present in the content distribution system 100.

At 202, the encoder 112 ingests a source content stream received from one or more receivers in the content network 102. The encoder 112 demultiplexes the received source content stream into video and/or audio tracks. When present, the video track is decoded into a sequence of uncompressed pictures. In some implementations, when there is a difference between a framerate of the source content stream and a framerate of an output content stream to be generated by the encoder 112, a framerate conversion may be performed as part of the decoding process to provide a set of uncompressed pictures at the framerate of the output content stream. The decoding process marks each frame with an associated PTS clock value. The association of the PTS clock value with each frame may be provided as metadata in the source content stream. At this point, the encoder 112 will obtain the same result as every other encoder in the content distribution system 100 that is processing the same source content stream.

At 204, the encoder 112 computes a number of clock cycles between IDR-frames. Though a standard GOP size is typically measured in numbers of frames, the calculation of a standard GOP size performed by the encoder 112 herein is based on numbers of clock cycles in units of the PTS clock so as to synchronize the IDR-frames on different encoders. For example, the PTS clock may be measured in units of a 90 khz clock. In such implementations, the standard GOP size is likewise calculated by the encoder 112 in units of 90 khz clock cycles. The standard GOP size is calculated as:

$$G=(S*C)/F \quad \text{equation 1,}$$

where G is the GOP size in units of the PTS clock, S is the GOP size in units of a number of frames between a current IDR-frame and its successor, C is the frequency of the PTS clock of the source content stream, and F is the video framerate of an output content stream from the encoder 112. The value of S is a configurable parameter of the encoder 112.

At 206, the encoder 112 determines a PTS clock value for the current frame, P. As noted above, the association of the PTS clock value with each frame may be provided as metadata in the source content stream.

At 208, the encoder 112 calculates a value T that is used to determine whether the current frame should be marked as an IDR-frame. The value of T is calculated based on modulo arithmetic as:

$$T=P \bmod G \quad \text{equation 2,}$$

where P is the PTS clock value for the current frame of the source content stream, and G is the size of a GOP in units of the PTS clock. In other words, T is a value of the modulus of the PTS clock value for the current frame and the size of a GOP in units of the PTS clock. State another way, T is a remainder after a division of an associated PTS clock value of a given frame by the number of clock cycles between IDR-frames.

At 210, the encoder 112 determines whether the value of T is strictly less than a number of PTS clock cycles per frame in the output content stream. The number of PTS clock cycles per frame is calculated as:

$$C/F \quad \text{equation 3,}$$

where C is the frequency of the PTS clock of the source content stream, and F is the video framerate of the output content stream. If the value of T is strictly less than the number of PTS clock cycles per frame, then the current frame is marked as an IDR-frame in 212. Otherwise, the current frame is marked as an internal frame within the GOP in 214. At 216, a next frame in the source content stream is examined and the process repeats back to 206.

The process 200 described above results in the encoder 112 producing a set of marked video frames where each frame is marked as either an IDR-frame or an internal frame within a GOP. The encoder 112 passes the set of marked video frames through a video codec and a set of audio frames are passed through an audio codec. The frames are encoded by the respective codecs according to the configuration of the encoder 112, including possibly outputting multiple resolutions and bitrates from the source content stream. The resulting output(s) from the encoder 112 are multiplexed into a desired output format(s), and distributed via the distribution network 106 to CPE 108. For example, the output of the encoder 112 may be streamed over its attached output communication network (e.g. via IP multicast transport).

A first boundary case may occur when the encoder 112 first starts to encode the source content stream. In this first boundary case, the encoder 112 will discard video and audio frames until a first frame is marked as an IDR-frame. Based on the equations provide above, the largest number of frames that may be discarded by the encoder 112 may be S-1. In other words, the number of frames that may be discarded by the encoder 112 when it first starts encoding the source content stream is strictly less than S.

A second boundary case may occur when the PTS clock wraps around to 0 periodically (e.g., for an MPEG-2 Transport Stream, the PTS clock wraps every 26 hours, 30 minutes and 43.7 seconds). If the PTS clock wraps, the process 200 will continue to be used by the encoder 112, although in this case the resulting GOP size at the wrap point most likely will differ from the configured GOP size (S). In most cases the first frame after the PTS clock wrap point would be marked as an IDR-frame. At one extreme, there may be two IDR-frames in a row. At the other extreme, the longest possible GOP at the wrap point would be (2S-1).

Because the source content stream input to each of the encoders in the content distribution system 100 is identical, the output from each of the encoders following the above algorithm is also identical. Accordingly, the process 200 provides for synchronizing the encoders in the content distribution system 100 to produce identical output content stream(s) without requiring communication between the encoders.

In some implementations, the framerate, F, in equations 1 and 3 may be the framerate of the source content stream.

It should be appreciated that the logical operations described herein with respect to the various figures may be implemented (1) as a sequence of computer implemented acts or program modules (i.e., software) running on a computing device (e.g., the computing device described in FIG. 3), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
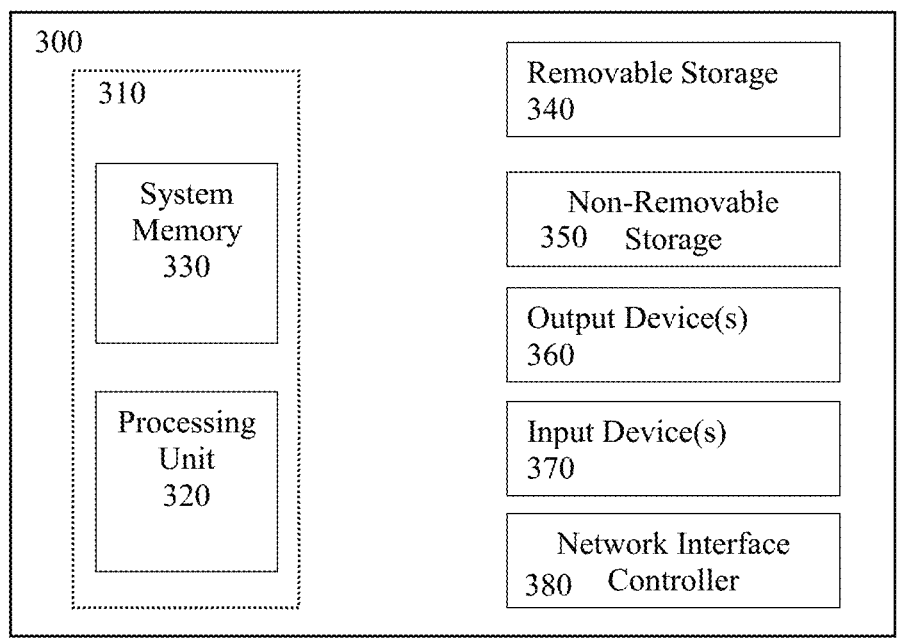
FIG. 3 illustrates an exemplary computer system suitable for implementing the several embodiments of the disclosure.

Referring to FIG. 3, an example computing device 300 upon which embodiments of the invention may be implemented is illustrated. For example, each of the content source, key server, segmentations servers, caching servers, and client devices described herein may each be implemented as a computing device, such as computing device 300. It should be understood that the example computing device 300 is only one example of a suitable computing environment upon which embodiments of the invention may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 300 to provide the functionality of a number of servers that is not directly bound to the number of computers in the computing device 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. While only one processing unit 306 is shown, multiple processors may be present. Thus, while instructions may be discussed as executed by a processor, the instructions may be executed simultaneously, serially, or otherwise executed by one or multiple processors. The computing device 300 may also include a bus or other communication mechanism for communicating information among various components of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices such as over the communication pathways described herein. The network connection(s) 316 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 300 may also have input device(s) 314 such as keyboards, keypads, switches, dials, mice, track balls, touch screens, voice recognizers, card readers, paper tape readers, or other well-known input devices. Output device(s) 312 such as printers, video monitors, liquid crystal displays (LCDs), touch screen displays, displays, speakers, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media, and non-removable media implemented in any method or technology for storage of information such as computer readable instructions, data structures, program modules or other data. System memory 304, removable storage 308, and non-removable storage 310 are all examples of tangible, computer storage media. Example tangible or non-transitory, computer-readable storage media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media or non-transitory computer readable medium, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a non-transitory computer-readable storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A content distribution system, comprising:
an encoder at a headend comprising a processor and computer instructions stored in a non-transitory computer readable storage medium, wherein the processor is configured to execute the instructions to cause the encoder to:
decode a source video content stream into a sequence of uncompressed frames, where each frame in the sequence is marked with an associated presentation time stamp (PTS) clock value;
calculate a standard group of pictures (GOP) size as a number of clock cycles between instantaneous decoder refresh (IDR)-frames;
for each frame in the sequence, calculate a remainder after a division of an associated PTS clock value of a given frame by the number of clock cycles between IDR-frames;
mark each frame in the sequence as an IDR-frame where the corresponding remainder is strictly less than a number of PTS clock cycles per frame and mark a remainder of the frames in the sequence as an internal frame within a GOP to produce a marked set of video frames, wherein at a wrap point when the PTS clock value wraps around to zero, continue to mark each frame in the sequence as an IDR-frame where the corresponding remainder is strictly less than a number of PTS clock cycles per frame, wherein a size of a GOP at the wrap point is different than the standard GOP size; and
pass the marked set of video frames through a video codec to output an output video content stream.

2. The content distribution system of claim 1, wherein the size of the GOP at the wrap point is less than the standard GOP size.

3. The content distribution system of claim 2, wherein the marked set of video frames includes two IDR-frames in a row at the wrap point.

4. The content distribution system of claim 1, wherein the size of the GOP at the wrap point is greater than the standard GOP size.

5. The content distribution system of claim 4, wherein the size of the GOP at the wrap point is strictly less than twice the standard GOP size.

6. The content distribution system of claim 1, wherein the PTS clock wraps around to zero every 26 hours, 30 minutes, and 43.7 seconds.

7. The content distribution system of claim 1, wherein the output video content stream has IDR-frames at the same locations as a second output video content stream of a second encoder.

8. The content distribution system of claim 7, wherein the processor is configured to execute the instructions to cause the encoder to:
discard frames in the sequence prior to a first IDR-frame.

9. The content distribution system of claim 7, further comprising:
the second encoder comprising a second processor and second computer instructions stored in a non-transitory computer readable storage medium, wherein the second processor is configured to execute the second instructions to cause the second encoder to:
decode the source video content stream into a second sequence of uncompressed frames, where each frame in the second sequence is marked with an associated PTS clock value;
calculate the number of clock cycles between IDR-frames;
for each frame in the second sequence, calculate a remainder after a division of an associated PTS clock value of a given frame by the number of clock cycles between IDR-frames;
mark each frame in the second sequence as an IDR-frame where the corresponding remainder is strictly less than the number of PTS clock cycles per frame and mark a remainder of the frames in the second sequence as an internal frame within a GOP to produce a second marked set of video frames; and
pass the second marked set video frames through a second video codec to output the second output video content stream.

10. The content distribution system of claim 9, wherein the encoder and the second encoder are not in communication with one another.

11. A method of synchronizing video output streams on multiple encoders without communication therebetween, the method comprising:
decoding, at each of the encoders, a source video content stream into a sequence of uncompressed frames, where each frame in the sequence is marked with an associated presentation time stamp (PTS) clock value;
calculating, at each of the encoders, a standard group of pictures (GOP) size as a number of clock cycles between instantaneous decoder refresh (IDR)-frames;
for each frame in the sequence, calculating, at each of the encoders, a remainder after a division of an associated PTS clock value of a given frame by the number of clock cycles between IDR-frames;
marking, at each of the encoders, each frame in the sequence as an IDR-frame where the corresponding remainder is strictly less than the number of PTS clock cycles per frame and marking a remainder of the frames in the sequence as an internal frame within a group of pictures (GOP) to produce a marked set of video frames, wherein at a wrap point when the PTS clock value wraps around to zero, continue marking each frame in the sequence as an IDR-frame where the corresponding remainder is strictly less than a number of PTS clock cycles per frame, wherein a size of a GOP at the wrap point is different than the standard GOP size; and
passing the marked set video frames through a video codec to produce the synchronized video output streams.

12. The method of claim 11, wherein the size of the GOP at the wrap point is less than the standard GOP size.

13. The method of claim 12, wherein the marked set of video frames includes two IDR-frames in a row at the wrap point.

14. The content distribution system of claim 11, wherein the size of the GOP at the wrap point is greater than the standard GOP size.

15. The content distribution system of claim 14, wherein the size of the GOP at the wrap point is strictly less than twice the standard GOP size.

16. The content distribution system of claim 11, wherein the PTS clock wraps around to zero every 26 hours, 30 minutes, and 43.7 seconds.

17. The method of claim 11, wherein the synchronized video output streams from each of the encoders is identical.

18. The method of claim 17, further comprising:
    discarding, by each of the encoders, frames in the sequence prior to a first IDR-frame.

19. The method of claim 11, further comprising:
    generating, by a segmentation server in communication with one of the encoders, segments and a playlist for the video output stream by the one of the encoders.

20. The method of claim 11, further comprising:
    distributing, via a video distribution network between the encoders and a plurality of customer premise equipment, the synchronized video output streams from the encoders to the plurality of customer premise equipment.

* * * * *